United States Patent
Srinivasan et al.

(10) Patent No.: US 9,544,232 B2
(45) Date of Patent: Jan. 10, 2017

(54) SYSTEM AND METHOD FOR SUPPORTING VIRTUALIZED SWITCH CLASSIFICATION TABLES

(71) Applicant: Oracle International Corporation, Redwood Shores, CA (US)

(72) Inventors: Arvind Srinivasan, San Jose, CA (US); Marcelino Dignum, Menlo Park, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 116 days.

(21) Appl. No.: 14/072,658

(22) Filed: Nov. 5, 2013

(65) Prior Publication Data
US 2015/0124813 A1 May 7, 2015

(51) Int. Cl.
*H04L 12/743* (2013.01)
*H04L 12/54* (2013.01)
*H04L 12/713* (2013.01)

(52) U.S. Cl.
CPC .......... *H04L 45/7457* (2013.01); *H04L 12/56* (2013.01); *H04L 45/586* (2013.01)

(58) Field of Classification Search
CPC .. H04L 12/4641; H04L 49/10; H04L 61/2015; H04L 63/101
USPC ........................... 370/392; 709/245; 711/108
See application file for complete search history.

(56) References Cited

U.S. PATENT DOCUMENTS

| | | | |
|---|---|---|---|
| 5,717,952 A | 2/1998 | Christiansen et al. | |
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |

(Continued)

FOREIGN PATENT DOCUMENTS

| | | |
|---|---|---|
| GB | 2367728 | 4/2002 |
| WO | 0051004 | 8/2000 |

(Continued)

OTHER PUBLICATIONS

International Report on Patentability issued in PCT/US2012/020746 mailed Aug. 29, 2013, 7 pages.

(Continued)

*Primary Examiner* — Christine Duong
(74) *Attorney, Agent, or Firm* — Tucker Ellis LLP

(57) ABSTRACT

A system and method can support dynamic provisioning in a network switch environment, such as supporting virtualized switch classification tables in a network switch. The system can provide a plurality of memory blocks that can be used to build one or more classification tables for supporting packet processing. Furthermore, the system can comprise a management entity that operates to monitor traffic profile associated with a network port in the network switch. Then, the management entity can allocate one or more memory blocks in the plurality of memory blocks for a logical classification table, and associate the logical classification table with the network port.

18 Claims, 4 Drawing Sheets

(56) References Cited

U.S. PATENT DOCUMENTS

| | | |
|---|---|---|
| 6,757,731 B1 | 6/2004 | Barnes et al. |
| 6,771,595 B1 | 8/2004 | Gilbert et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 6,985,937 B1 | 1/2006 | Keshav et al. |
| 7,046,665 B1 | 5/2006 | Walrand et al. |
| 7,111,303 B2 | 9/2006 | Macchiano et al. |
| 7,120,152 B2 | 10/2006 | Park |
| 7,146,431 B2 | 12/2006 | Hipp et al. |
| 7,177,311 B1 | 2/2007 | Hussain et al. |
| 7,200,704 B2 | 4/2007 | Njoku et al. |
| 7,260,102 B2 | 8/2007 | Mehrvar et al. |
| 7,313,142 B2 | 12/2007 | Matsuo et al. |
| 7,450,498 B2 | 11/2008 | Golia et al. |
| 7,480,302 B2 | 1/2009 | Choi |
| 7,502,884 B1 | 3/2009 | Shah et al. |
| 7,561,531 B2 | 7/2009 | Lewites et al. |
| 7,613,132 B2 | 11/2009 | Tripathi et al. |
| 7,620,955 B1 | 11/2009 | Nelson |
| 7,633,955 B1 | 12/2009 | Saraiya et al. |
| 7,688,838 B1 | 3/2010 | Aloni et al. |
| 7,694,298 B2 | 4/2010 | Goud et al. |
| 7,730,205 B2 | 6/2010 | Rothman et al. |
| 7,730,486 B2 | 6/2010 | Herington |
| 7,761,617 B2 | 7/2010 | Seigneret et al. |
| 7,782,868 B2 | 8/2010 | Hsieh et al. |
| 7,827,598 B2 | 11/2010 | Moran et al. |
| 7,865,781 B2 | 1/2011 | Fox et al. |
| 7,877,524 B1 | 1/2011 | Annem et al. |
| 7,885,257 B2 | 2/2011 | Droux et al. |
| 8,031,709 B2 * | 10/2011 | Alexander, Jr. ............... 370/389 |
| 8,073,990 B1 | 12/2011 | Baron et al. |
| 8,295,275 B2 | 10/2012 | Mann |
| 8,358,651 B1 * | 1/2013 | Kadosh et al. ............... 370/360 |
| 8,370,530 B2 | 2/2013 | Tripathi et al. |
| 8,396,514 B2 | 3/2013 | Adams |
| 8,848,412 B1 * | 9/2014 | Yeung et al. ................. 365/49.1 |
| 2002/0013861 A1 | 1/2002 | Adiletta et al. |
| 2002/0052972 A1 | 5/2002 | Yim |
| 2002/0080721 A1 | 6/2002 | Tobagi et al. |
| 2003/0037154 A1 | 2/2003 | Poggio et al. |
| 2003/0041216 A1 | 2/2003 | Rosenbluth et al. |
| 2003/0120772 A1 | 6/2003 | Husain et al. |
| 2003/0140196 A1 | 7/2003 | Wolrich et al. |
| 2004/0015966 A1 | 1/2004 | MacChiano et al. |
| 2004/0130961 A1 | 7/2004 | Kuo et al. |
| 2004/0199808 A1 | 10/2004 | Freimuth et al. |
| 2004/0202182 A1 | 10/2004 | Lund et al. |
| 2004/0210623 A1 | 10/2004 | Hydrie et al. |
| 2004/0267866 A1 | 12/2004 | Carollo et al. |
| 2005/0018601 A1 | 1/2005 | Kalkunte |
| 2005/0111455 A1 | 5/2005 | Nozue et al. |
| 2005/0135243 A1 | 6/2005 | Lee et al. |
| 2005/0138620 A1 | 6/2005 | Lewites |
| 2005/0182853 A1 | 8/2005 | Lewites et al. |
| 2005/0251802 A1 | 11/2005 | Bozek et al. |
| 2006/0041667 A1 | 2/2006 | Ahn et al. |
| 2006/0045088 A1 | 3/2006 | Nguyen |
| 2006/0045089 A1 | 3/2006 | Bacher et al. |
| 2006/0045109 A1 | 3/2006 | Blackmore et al. |
| 2006/0070066 A1 | 3/2006 | Grobman |
| 2006/0092928 A1 | 5/2006 | Pike et al. |
| 2006/0174324 A1 | 8/2006 | Zur et al. |
| 2006/0206300 A1 | 9/2006 | Garg et al. |
| 2006/0206602 A1 | 9/2006 | Hunter et al. |
| 2006/0218556 A1 | 9/2006 | Nemirovsky |
| 2006/0233168 A1 | 10/2006 | Lewites et al. |
| 2006/0236063 A1 | 10/2006 | Hausauer et al. |
| 2006/0248229 A1 * | 11/2006 | Saunderson et al. ......... 709/245 |
| 2006/0253619 A1 | 11/2006 | Torudbakken et al. |
| 2007/0019646 A1 | 1/2007 | Bryant et al. |
| 2007/0047536 A1 | 3/2007 | Scherer et al. |
| 2007/0078988 A1 | 4/2007 | Miloushev et al. |
| 2007/0083723 A1 | 4/2007 | Dey et al. |
| 2007/0101323 A1 | 5/2007 | Foley et al. |
| 2007/0183418 A1 | 8/2007 | Riddoch et al. |
| 2007/0244937 A1 | 10/2007 | Flynn et al. |
| 2007/0244972 A1 | 10/2007 | Fan |
| 2007/0288720 A1 | 12/2007 | Cholleti et al. |
| 2008/0002683 A1 | 1/2008 | Droux et al. |
| 2008/0005748 A1 | 1/2008 | Mathew et al. |
| 2008/0019365 A1 | 1/2008 | Tripathi et al. |
| 2008/0022016 A1 | 1/2008 | Tripathi et al. |
| 2008/0043765 A1 | 2/2008 | Belgaied et al. |
| 2008/0144635 A1 | 6/2008 | Carollo et al. |
| 2008/0171550 A1 | 7/2008 | Zhao |
| 2008/0192648 A1 | 8/2008 | Galles |
| 2008/0222734 A1 | 9/2008 | Redlich et al. |
| 2008/0225853 A1 * | 9/2008 | Melman et al. ............... 370/392 |
| 2008/0225875 A1 | 9/2008 | Wray et al. |
| 2008/0235755 A1 | 9/2008 | Blaisdell et al. |
| 2008/0239945 A1 | 10/2008 | Gregg |
| 2008/0253379 A1 | 10/2008 | Sasagawa |
| 2008/0270599 A1 | 10/2008 | Tamir et al. |
| 2009/0006593 A1 | 1/2009 | Cortes |
| 2009/0125752 A1 | 5/2009 | Chan et al. |
| 2009/0150576 A1 | 6/2009 | Madruga et al. |
| 2009/0150883 A1 | 6/2009 | Tripathi et al. |
| 2009/0187679 A1 | 7/2009 | Puri |
| 2009/0193216 A1 | 7/2009 | Melvin |
| 2009/0265299 A1 | 10/2009 | Hadad et al. |
| 2009/0328073 A1 | 12/2009 | Tripathi |
| 2010/0046531 A1 | 2/2010 | Louati et al. |
| 2010/0332698 A1 | 12/2010 | Muller |
| 2011/0019574 A1 | 1/2011 | Malomsoky et al. |
| 2011/0080830 A1 | 4/2011 | Ko et al. |
| 2011/0149966 A1 | 6/2011 | Pope et al. |
| 2011/0161580 A1 * | 6/2011 | Shah et al. ................... 711/108 |
| 2011/0161619 A1 | 6/2011 | Kaminski et al. |
| 2012/0017265 A1 | 1/2012 | Twitchell, Jr. |
| 2012/0044948 A1 * | 2/2012 | Nachum et al. ............... 370/401 |
| 2012/0207158 A1 | 8/2012 | Srinivasan et al. |
| 2012/0311597 A1 | 12/2012 | Manula |
| 2013/0268700 A1 | 10/2013 | Fuhs et al. |
| 2015/0007187 A1 | 1/2015 | Shows |
| 2015/0127762 A1 | 5/2015 | Srinivasan et al. |

FOREIGN PATENT DOCUMENTS

| | | |
|---|---|---|
| WO | 2005057318 A2 | 6/2005 |
| WO | 2008093174 A1 | 8/2008 |

OTHER PUBLICATIONS

International Search Report and Written Opinion for PCT/US2012/020746 dated Mar. 13, 2012, 9 pages.

Office Action from the United States Patent and Trademark Office for U.S. Appl. No. 11/953,829, mailed Aug. 4, 2010, 30 pages.

Office Action from the United States Patent and Trademark Office for U.S. Appl. No. 11/953,837, mailed Jun. 11, 2010, 27 pages.

Office Action from the United States Patent and Trademark Office for U.S. Appl. No. 11/953,839, mailed Aug. 19, 2010, 30 pages.

Office Action from the United States Patent and Trademark Office for U.S. Appl. No. 12/040,165, mailed Feb. 8, 2010, 40 pages.

Notice of Allowance from the United States Patent and Trademark Office for U.S. Appl. No. 12/040,165, mailed Oct. 29, 2010, 18 pages.

Office Action from the United States Patent and Trademark Office for U.S. Appl. No. 12/040,101, mailed May 6, 2010, 39 pages.

Office Action from the United States Patent and Trademark Office for U.S. Appl. No. 11/953,842, mailed Apr. 30, 2010, 39 pages.

Final Office Action from the United States Patent and Trademark Office for U.S. Appl. No. 11/953,842, mailed Oct. 15, 2010, 32 pages.

Office Action from the United States Patent and Trademark Office for U.S. Appl. No. 12/040,105, mailed Nov. 20, 2009, 93 pages.

Final Office Action from the United States Patent and Trademark Office for U.S. Appl. No. 12/040,105, mailed May 26, 2010, 26 pages.

(56) References Cited

OTHER PUBLICATIONS

Notice of Allowance from the United States Patent and Trademark Office for U.S. Appl. No. 12/040,105, mailed Oct. 5, 2010, 27 pages.
Office Action from the United States Patent and Trademark Office for U.S. Appl. No. 11/953,843, mailed May 3, 2010, 169 pages.
Final Office Action from the United States Patent and Trademark Office for U.S. Appl. No. 11/953,843, mailed Oct. 15, 2010, 33 pages.
Office Action from the United States Patent and Trademark Office for U.S. Appl. No. 12/053,666, mailed Dec. 10, 2009, 36 pages.
Final Office Action from the United States Patent and Trademark Office for U.S. Appl. No. 12/053,666, mailed Jun. 11, 2010, 27 pages.
Notice of Allowance from the United States Patent and Trademark Office for U.S. Appl. No. 12/053,666, mailed Oct. 7, 2010, 15 pages.
Office Action from the United States Patent and Trademark Office for U.S. Appl. No. 12/053,676, mailed Dec. 9, 2009, 41 pages.
Notice of Allowance from the United States Patent and Trademark Office for U.S. Appl. No. 12/053,676, mailed Jul. 15, 2010, 20 pages.
Final Office Action from the United States Patent and Trademark Office for U.S. Appl. No. 12/040,101, mailed Dec. 13, 2010, 25 pages.
European Patent Office, International Searching Authority, International Search Report and Written Opinion dated Mar. 16, 2015 for International Application No. PCT/US2014/059749, 13 pages.
Trapeze, Trapeze Overview, Jan. 1, 1998, USENIX, retrieved from the Internet, <usenix.org/publications/library/proceedings/usenix98/full_papers/anderson/anderson_html/node4.html>, 2 pages.
Goldenberg, D. et al., Zero Copy Sockets Direct Protocol over InfiniBand—Preliminary Implementation and Performance Analysis, Proceedings of the 13th Symposium on High Performance Interconnects, Piscataway, NJ, Aug. 17-19, 2005, pp. 128-137, 10 pages.
I/O Virtualization Using Mellanox InfiniBand and Channel I/O Virtualization (CIOV) Technology, XP-002541674, 2007, retrieved from the Internet, <http://www.mellanox.com/pdf/whitepapers/WP_Virtualize_with_IB.pdf>, pp. 1-16, 16 pages.
InfiniBand Software Stack, XP-002541744, Jan. 1, 2006, retrieved from the Internet, <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>, pp. 1-2, 2 pages.
Wheeler, B., 10 Gigabit Ethernet in Servers: Benefits and Challenges, XP-002541745, Jan. 2005, retrieved from the Internet, <http://www.hp.com/products1/serverconnectivity/adapters/ethernet/10gbe/infolibrary110GbE_White_Paper.pdf>, 8 pages.
Windows Platform Design Notes: Winsock Direct and Protocol Offload on SANs, XP-002541746, Mar. 3, 2001, retrieved from the Internet, <http://download.microsoft.com/download/1/6/1/161ba512-40e2-4cc9-843a-923143f3456c,/WinsockDirect-ProtocolOffload.doc>, 8 pages.

International Search Report from PCT/US2009/048594 dated Sep. 7, 2009, 4 pages.
Written Opinion from PCT/US2009/048594 dated Sep. 7, 2009, 1 page.
Tripathi, S., Crossbow Architectural Document, Nov. 21, 2006, 19 pages.
Nordmark, E., IP Instances—Network Isolation Meets Zones, presented at SVOSUG, Oct. 26, 2006, 28 pages.
Tripathi, S., CrossBow: Network Virtualization and Resource Control, presented at SVOSUG, Aug. 24, 2006, 27 pages.
Tripathi, S., CrossBow: Network Virtualization and Resource Control, presented at Sun Labs Open House, Jun. 1, 2006, 24 pages.
Kumar, R., ASI and PCI Express: Complementary Solutions, Dec. 2004, RTC magazine, retrieved from the Internet, <rtcmagazine.com/articles/view/100274>, 5 pages.
Martinez, R. et al., Providing Quality of Service Over Advanced Switching, 2006, IEEE, retrieved from the Internet, <ieeexplore.ieee.org/xpls/abs_all.jsp?amumber=1655667&tag=1>, 10 pages.
Apani, Brave New World, Feb. 1, 2007, iSmile, retrieved from the Internet, <ismile.com/PDFs/Apani_Segmentation_WP.pdf>, 8 pages.
OpenSolaris, Popuri, OpenSolaris Virtualization Technologies, Feb. 23, 2007, retrieved from the Internet, <hub.opensolaris.org/bin/view/Community+Group+advocacy/techdays%2Darchive%2D06%2D07>, 2 pages.
International Search Report issued in PCT/US2009/035405, dated Aug. 19, 2009, 3 pages.
International Preliminary Report on Patentability issued in PCT/US2009/035405, dated Sep. 10, 2010, 9 pages.
Dovrolis, C. et al., HIP: Hybrid Interrupt—Polling for the Network Interface: ACM SIGOPS Operating Systems Review, vol. 35, Iss. 4, Oct. 2001, 11 pages.
Tripathi, S., Solaris Networking—The Magic Revealed (Part I), Sunay Tripathi's Solaris Networking Weblog, Nov. 14, 2005, pp. 1-22, 22 pages.
Tripathi, S., CrossBow: Solaris Network Virtualization and Resource Control, Crossbow Architectural Document, Nov. 21, 2006, 19 pages.
Nordmark, E. et al., IP Instances Interface Document, PSARC 2006/366, Dec. 28, 2006, 17 pages.
Nordmark, E., IP Instances Design Document, PSARC 2006/366, Dec. 21, 2006, 38 pages.
Tripathi, S., CrossBow: Solaris Network Virtualization & Resource Control, CrossBow Overview Document, Aug. 23, 2006, 12 pages.
Nordmark, E., IP Instances—Network Isolation Meets Zones, presented at the SVOSUG meeting, Oct. 26, 2006, 28 pages.
Tripathi, S., CrossBow: Network Virtualization and Resource Control, presented at the SVOSUG meeting, Aug. 24, 2006, 28 pages.
Tripathi, S., Crossbow: ReCap, presented at an internal Sun Labs Open House presentation on Jun. 1, 2006, made public Aug. 2006, 23 pages.
United States Patent and Trademark Office, Office Action Dated Mar. 31, 2016 for U.S. Appl. No. 14/072,597, 16 pages.

\* cited by examiner

SYSTEM AND METHOD FOR SUPPORTING VIRTUALIZED SWITCH CLASSIFICATION TABLES

CROSS REFERENCE TO RELATED APPLICATIONS

This application is related to the following patent applications, each of which is hereby incorporated by reference in its entirety:

U.S. Patent Application entitled "SYSTEM AND METHOD FOR SUPPORTING EFFICIENT PACKET PROCESSING MODEL IN A NETWORK ENVIRONMENT", application Ser. No. 14/072,566, filed Nov. 5, 2013.

U.S. Patent Application entitled "SYSTEM AND METHOD FOR SUPPORTING OPTIMIZED BUFFER UTILIZATION FOR PACKET PROCESSING IN A NETWORKING DEVICE", application Ser. No. 14/072,597, filed Nov. 5, 2013.

U.S. patent application titled "METHOD AND SYSTEM FOR ROUTING NETWORK TRAFFIC FOR A BLADE SERVER", application Ser. No. 13/028,650, filed Feb. 16, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to an engineered system for middleware and application execution.

BACKGROUND

As larger cloud computing architectures are introduced, the performance and administrative bottlenecks associated with the traditional network and storage have become a significant problem. An engineered system, such as the Oracle engineered system, can provide excellent processing speeds, significantly faster deployments, instant visuals for in-depth analysis, and manageable big data capability. This is the general area that embodiments of the invention are intended to address.

SUMMARY

Described herein are systems and methods that can support dynamic provisioning resource in a network switch environment, such as supporting virtualized switch clasification tables in a network switch. The system can provide a plurality of memory blocks that can be used to build one or more classification tables for supporting packet processing. Furthermore, the system can comprise a management entity that operates to monitor traffic profile associated with a network port in the network switch. Then, the management entity can allocate one or more memory blocks in the plurality of memory blocks for a logical classification table, and associate the logical classification table with the network port.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the InfiniBand (IB) network switch as an example for a high performance network switch. It will be apparent to those skilled in the art that other types of high performance network switches can be used without limitation.

Described herein are systems and methods that can support dynamic provisioning resources in a network switch in a middleware machine environment.

Packet Processing Using Classification Tables

Figure 1:
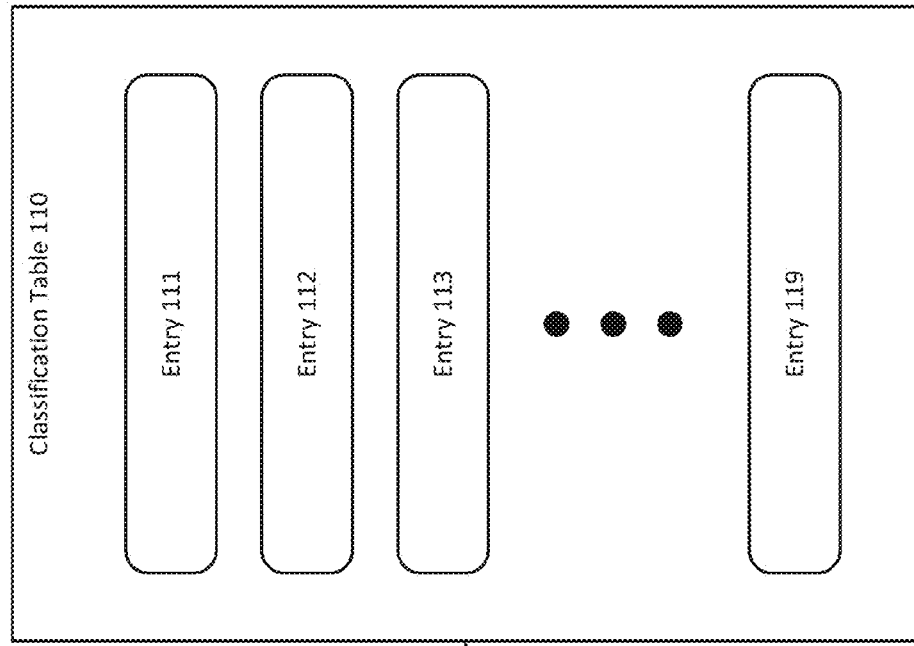
FIG. 1 shows an illustration of using a classification table to support packet processing in a network switch in a middleware machine environment, in accordance with an embodiment of the invention.
Figure 1:
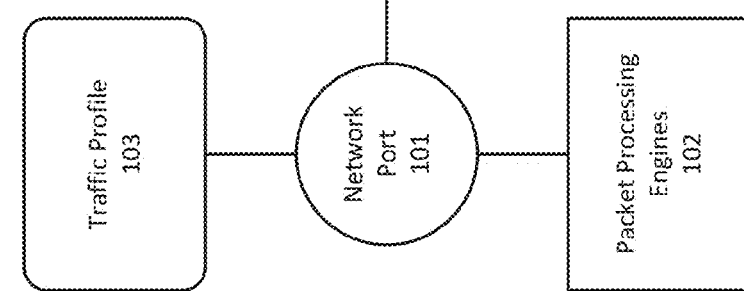

FIG. 1 shows an illustration of using a classification table to support packet processing in a network switch in a middleware machine environment, in accordance with an embodiment of the invention. As shown in FIG. 1, packet processing engines 102 can use one or more classification tables, e.g. a classification table 110, to process various packets received at a network port 101 in a high performance network switch environment 100.

Furthermore, the classification table 110, which can be built out of ternary content-addressable memory (TCAM), can include a plurality of entries, e.g. entries 111-119. The amount of the entries needed at each network port 101 may vary, depending on the traffic profiles 103. The system can dynamically allocate various numbers of entries for each network port 101 to accommodate its need.

In accordance with an embodiment of the invention, the network switch environment 100 can take advantage of a shared TCAM among multiple network ports. Each of the network ports can access one or more tables that reside in the shared TCAM. For example, the system can use a port number as a handle for the key to access different tables in the shared TCAM. Using the shared TCAM, the partitioning of the tables becomes a dynamic process and the system can accommodate a large amount of entries that are needed to be allocated per port.

On the other hand, the amount of the classification tables needed per port on a network switch can depend on the application states. For example, some of these additional entries can be caused by virtual machine (VM) migration, in addition to the application itself. Also, with the increasing of the network speeds and the increasing of the number of ports, the access time to the classification table may grow, and a network switch may run into serialization problems in accessing the TCAMs and similar tables. Thus, the TCAM sharing mechanism may not scale in the network switch environment 100, since the provisioning is done statically and the amount of the classification tables is not known a priori.

Alternatively, a dedicated TCAM per port (i.e. over provisioning every port) can be used to alleviate the problem. However, this over provisioning approach also can not scale to meet the need of increasing network speeds and a large number of ports, since application usage is dynamic and it is very difficult to estimate the degree of over provisioning that may be required. Also, over provisioning can cause excessive use of power and silicon area.

Additionally, in a high performance network system, different servers connected to the corresponding switch ports may be running different applications. In order to process packets and to enforce various policies, the width of the TCAM keys required may be different. For example, internet protocol version 6 (IPv6), which uses a three tuple key (source address, destination address, flow label), may need a wider key than the key used by the internet protocol version 4 (IPv4), which uses a five tuple key (source address, source port, destination address, destination port and protocol). Thus, it becomes expensive and wasteful to build every port in the network switch environment 100 with the widest possible key, when only some ports require this widest possible key.

Virtualized Switch Classification Tables

In accordance with an embodiment of the invention, a framework can be used to share classification tables in a high performance network switch, e.g. an IB network switch. Furthermore, the framework can support dynamic migration of classification resources as the application moves, e.g. in the case of virtual machine (VM) migrations.

Figure 2:
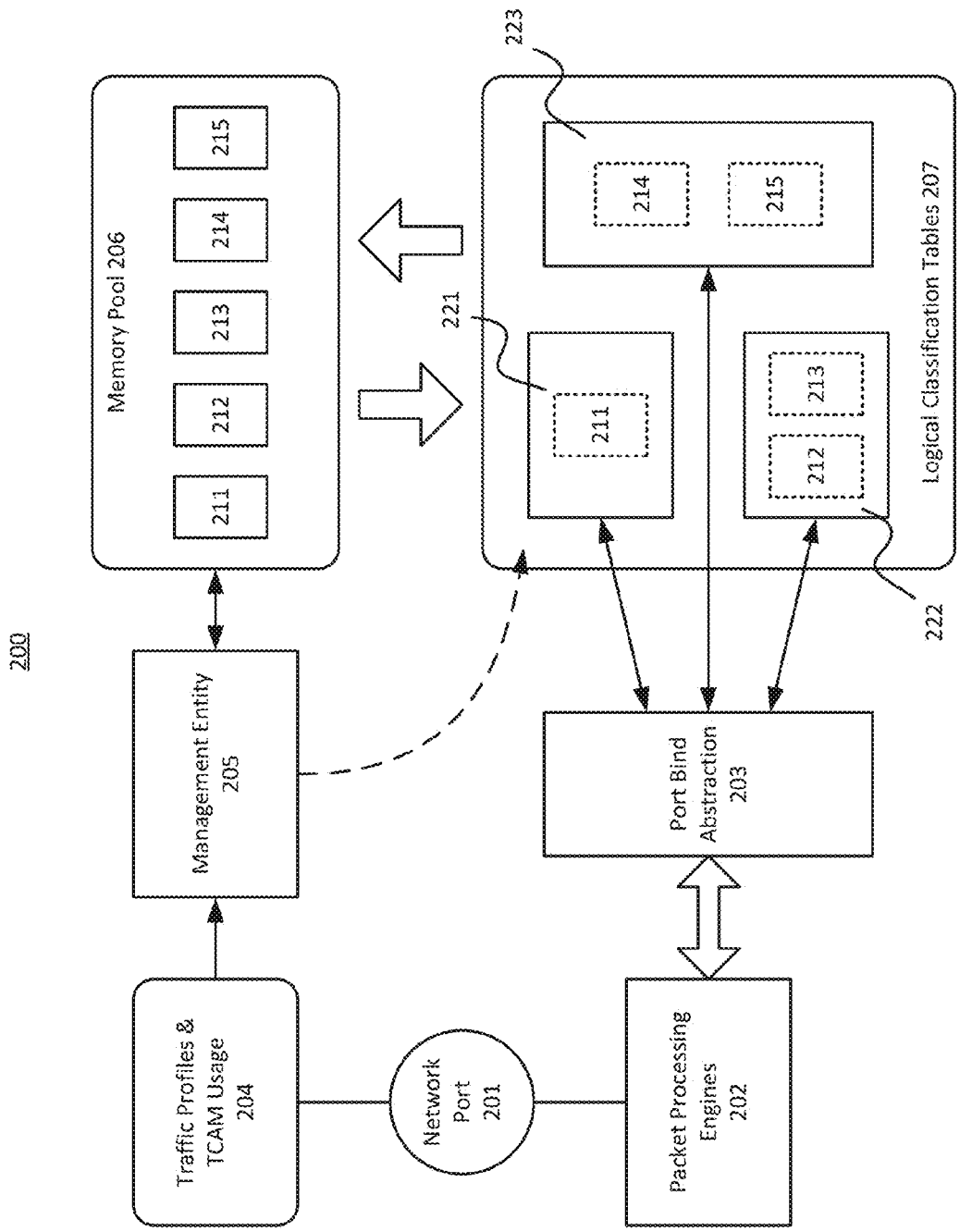
FIG. 2 shows an illustration of providing virtualized classification tables in a network switch environment, in accordance with an embodiment of the invention.

FIG. 2 shows an illustration of providing virtualized classification tables in a network switch, in accordance with an embodiment of the invention. As shown in FIG. 2, packet processing engines 202 can process various packets received at a network port 201 in a high performance network switch environment 200.

The system can provide a memory pool 206, which contains a plurality of memory blocks 211-215, such as the TCAM classification table building blocks. The network port 201 can get a logical TCAM table 207 as a result of an allocation process.

As shown in FIG. 2, based on traffic profiles and TCAM usages 204, a management entity 205 can dynamically allocate these memory blocks 211-215 to one or more network ports, (e.g. a network port 201), and/or deallocate these memory blocks 211-215 from these network ports. Furthermore, once a memory block in the memory blocks 211-215 is allocated by the management entity 205, the allocated memory block may be bound to only one network port, e.g. network port 201, until the deallocation process happens.

Alternatively, the allocated memory block may be bound to more than one network ports. For example, the resource management entity 205 can determine the number of the network ports to be bound with a given TCM tile based on bandwidth requirements, such as the total bandwidth that the TCAM allows.

Additionally, the packet processing engine 202 can be agnostic to the allocation and deallocation of these resources. A port bind abstraction layer 203 can hide the low level presence of these resources and any pipelines that may be using these resources. For example, the behavior of the packet processing engines (per port) may be identical in both the case of a TCAM miss and the case of a lack of TCAM resources (such as an unassigned TCAM).

In accordance with an embodiment of the invention, the TCAM memory blocks 211-215 can be stacked relative to each other in different logical TCAM tables 207. The stacking process can be initiated by the management entity 205 dynamically. Also, the stacking of TCAMs memory blocks 211-215 can be changed based on the needs of the network port 201.

Furthermore, the stacking can be either a vertical stacking or a horizontal stacking. As shown in FIG. 2, the logical classification table 222 contains two building blocks 212-213, which are horizontal stacked, whereas the logical classification table 223 contains two building blocks 214-215, which are vertical stacked. Also, a logical classification table 221 contains one building block 211 without stacking.

The vertical stacking can be used to increase the number of entries per logical TCAM table. As new blocks are stacked, precedence can be set among the stacked TCAMs memory blocks 214-215, in order for the logical table to appear to be linear. For example, if a TCAM building block consists 1K entries with 64 bits as the key width, the system can stack two of these building blocks vertically to get a TCAM table of 2K entries with 64 bits the key width.

On the other hand, the horizontal stacking can be used to increase the key width. The system can match the different key fields to each of these memory blocks 212-213 separately. For example, if a TCAM block consists 1K entries with 64 bits as the key width, the system can stack two of these building blocks horizontally to get a TCAM of 1K entries with 128 bits the key width.

In accordance with an embodiment of the invention, the management entity 205 can configure various parameters needed for different binds and stacking. The management entity 205 can monitor the traffic profiles of a network port 201, and can allocate/migrate TCAM resources based on the temporal need of the servers. Thus, each port can get a quota of TCAM tables, which may vary per port.

Figure 3:
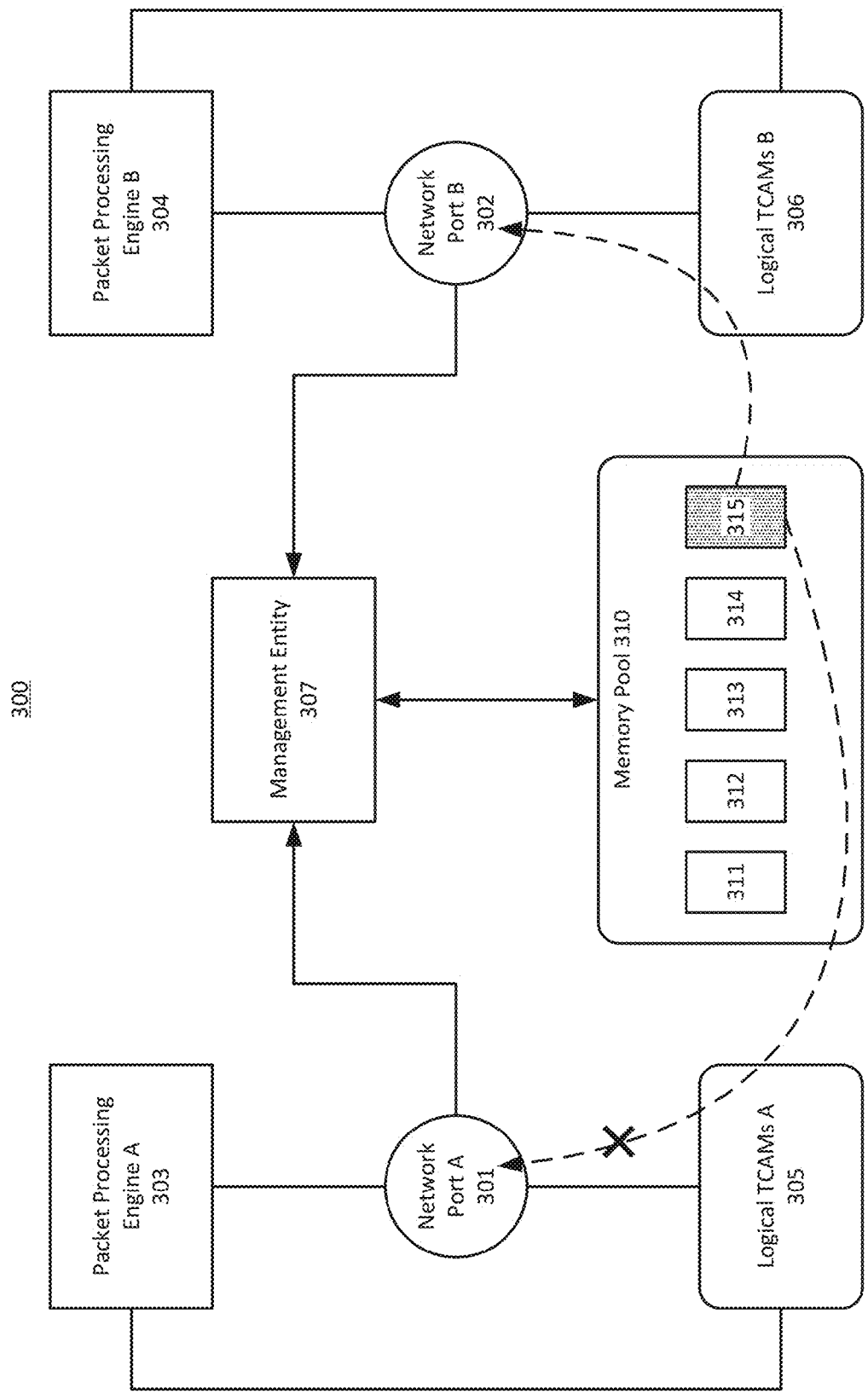
FIG. 3 shows an illustration of supporting dynamic migration of shared memory blocks between different network ports in a network switch environment, in accordance with an embodiment of the invention.

FIG. 3 shows an illustration of supporting dynamic migration of shared memory blocks between different network ports in a network switch environment, in accordance with an embodiment of the invention. As shown in FIG. 3, a network switch environment 300 can include a plurality of network ports (e.g. the network ports A-B 301-302). Furthermore, different packet processing engines 303-304 can process the traffic on the network ports A-B 301-302, using one or more logical TCAM tables A-B 305-306.

Additionally, a management entity 307 can be responsible for managing the logical TCAM tables A-B 305-306, by allocating and deallocating one or more shared memory blocks 311-315 located in a memory pool 310.

In accordance with an embodiment of the invention, each TCAM block can keep tracking the access statistics and the usage on per bound port. For example, once a TCAM block 315 is allocated and bound to a network port A 301, the TCAM block 315 can keep tracking how frequently the entries are used. A lack of hits in the TCAM block 315 can be used to age out the entries in that block. Once an entry is aged out from a TCAM block, the management entity 307 is notified and the management entity 307 can initiate the deallocation process as needed. Furthermore, since the TCAMs are migrated from port to port, there is no loss of traffic.

As shown in FIG. 3, the deallocation process can unbind the TCAM block 315 from the network port A 301, so that the free TCAM block 315 can be bound to another network port B 302. Thus, the TCAM block 315 can be used in the logical TCAM table B 306 and the packet processing engine B 304 can process the traffic on the network port B 302.

A use case is when these tables are used for routing purposes. In such a use case, a network switch may run out of routing table entries (e.g. causing a miss in the TCAM entries) at a network port, when the network port learns new routes. Using the above scheme, based on the traffic profiles, the management entity 307 can migrate the TCAM resources from a port with abundant resource to the network port that may need a large routing table.

Another use case is when multiple connected servers have an uneven number of virtual machines (VMs). In such a use case, the servers with more VMs may require additional entries to enforce access control list (ACL), while the servers with less number of VMs may have abundant resource. Thus, as the VMs migrate, the system can dynamically migrate TCAM resources from a switch port with less VMs to a switch port with more VMs.

In accordance with an embodiment of the invention, the system can provide a mechanism to dynamically provision classification resources, and to dynamically migrate classification tables between network ports on a need basis. This classification table sharing mechanisms can scale accordingly to increasing of the network speed and the number of network ports. Thus, the framework can provide scalability when performing dynamic provisioning.

Figure 4:
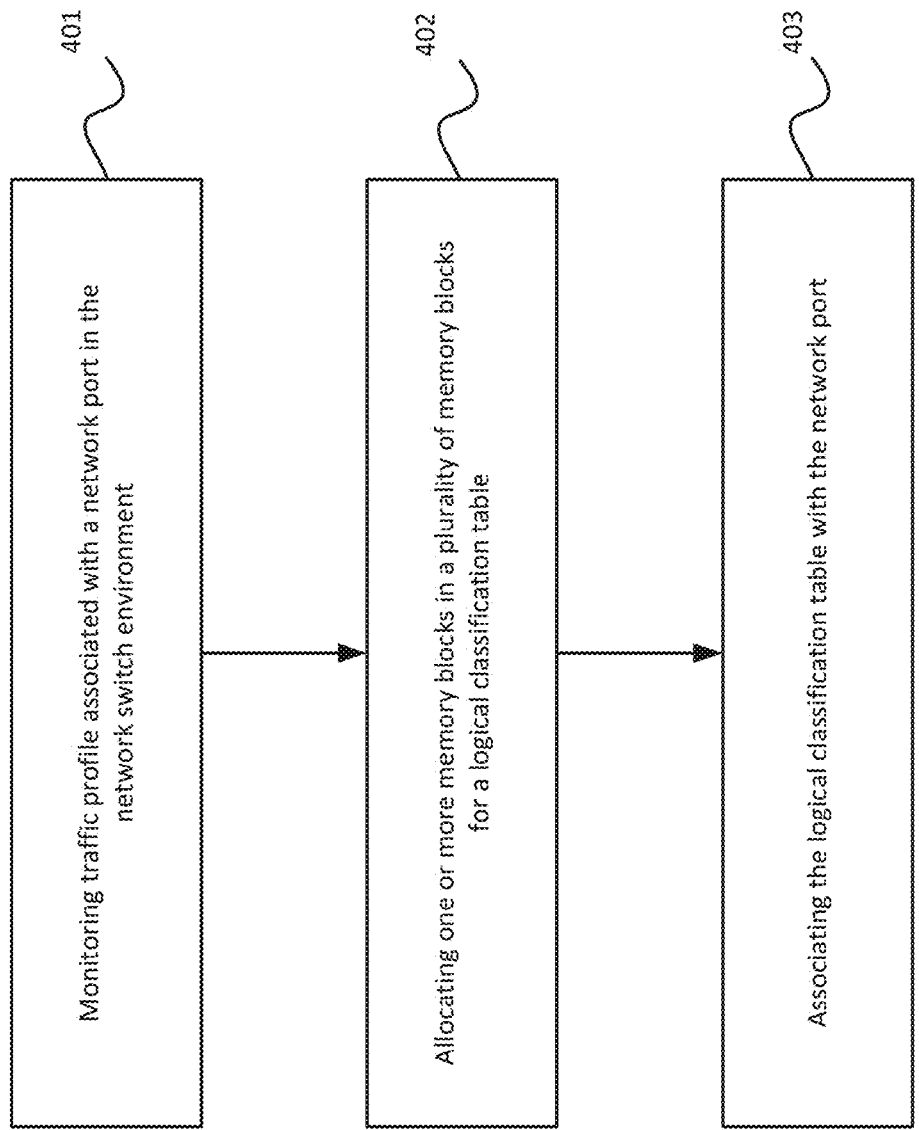
FIG. 4 illustrates an exemplary flow chart for providing virtualized classification tables in a network switch environment, in accordance with an embodiment of the invention.

FIG. 4 illustrates an exemplary flow chart for providing virtualized classification tables in a network switch environment, in accordance with an embodiment of the invention. As shown in FIG. 4, at step 401, a management entity in the network switch environment can monitor traffic profile associated with a network port in the network switch environment. Then, at step 402, the management entity can allocate one or more memory blocks in a plurality of memory blocks for a logical classification table. Furthermore, at step 403, the management entity can associate the logical classification table with the network port.

Many features of the present invention can be performed in, using, or with the assistance of hardware, software, firmware, or combinations thereof. Consequently, features of the present invention may be implemented using a processing system (e.g., including one or more processors).

Features of the invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art(s).

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting dynamic provisioning of resources comprising:
    a network switch comprising a plurality of network ports and a plurality of memory blocks in a content-addressable memory, wherein each memory block of the plurality of memory blocks is bound to one or more of the plurality of network ports;
    a packet processing engine that processes network traffic received at a network port of the plurality of network ports; and
    a management entity that operates to
        monitor a traffic profile of the network traffic received at the network port and a another traffic profile of another network traffic received at another network port of the plurality of network ports,
        deallocate one or more memory blocks of said plurality of memory blocks from the another network port,
        allocate, based on the traffic profile of the network traffic received at the network port, said one or more memory blocks for use by the network port as a logical classification table, and associate the logical classification table with the network port, for use by the packet processing engine in processing subsequent network traffic received at the network port.

2. The system according to claim 1, wherein:
the content-addressable memory is a ternary content-addressable memory (TCAM).

3. The system according to claim 1, wherein:
the management entity operates to deallocate said one or more memory blocks from the another network port based on the another traffic profile of another network traffic received at the another network port.

4. The system according to claim 3, wherein:
each memory block of the plurality of memory blocks is bound to said one or more network ports until the memory block is deallocated from said one or more ports.

5. The system according to claim 1, further comprising:
a port bind abstraction layer that hides low level presence of the plurality of memory blocks from the packet processing engine.

6. The system according to claim 1, wherein:
each memory block of the plurality of memory blocks keeps track of access statistics and usage on a pre-bound network port.

7. The system according to claim 1, wherein:
the logical classification table is based on stacking said one or more memory blocks.

8. The system according to claim 7, wherein:
a vertical stacking of said one or more memory blocks is used to increase a number of entries in said logical classification table.

9. The system according to claim 7, wherein:
a horizontal stacking of said one or more memory blocks is used to increase a key width in said logical classification table.

10. A method for supporting dynamic provisioning of resources in a network switch comprising a plurality of network ports and a plurality of memory blocks in a content-addressable memory, wherein each memory block of the plurality of memory blocks is bound to one or more of the plurality of network ports, the method comprising:
providing a packet processing engine that processes network traffic received at a network port of the plurality of network ports in the network switch;
monitoring a traffic profile of the network traffic received at the network port and another traffic profile of another network traffic received at another network port of the plurality of network ports;
deallocating one or more memory blocks of the plurality of memory blocks from said another network port;
allocating, based on the traffic profile of the network traffic received at the network port, said one or more memory blocks for use by the network port as a logical classification table; and
associating the logical classification table with the network port, for use by the packet processing engine in processing subsequent network traffic received at the network port.

11. The method according to claim 10, wherein:
the content-addressable memory is a ternary content-addressable memory (TCAM).

12. The method according to claim 10, further comprising:
deallocating said one or more memory blocks from the another network port based on the another traffic profile of another network traffic received at the another network port.

13. The method according to claim 12, further comprising:
binding each memory block of the plurality of memory blocks to said one or more network ports until the memory block is deallocated from said one or more ports.

14. The method according to claim 10, further comprising:
providing a port bind abstraction layer that hides low level presence of the plurality of memory blocks from the packet processing engine.

15. The method according to claim 10, wherein:
tracking access statistics and usage in each memory block of the plurality of memory blocks.

16. The method according to claim 10, further comprising:
stacking said one or more memory blocks for use as said logical classification table.

17. The method according to claim 16, further comprising at least one of:
using a vertical stacking of said one or more memory blocks to increase a number of entries in said logical classification table, or
using a horizontal stacking of said one or more memory blocks to increase a key width in said logical classification table.

18. A non-transitory machine readable storage medium having instructions stored thereon for supporting dynamic provisioning of resources in a network switch comprising a plurality of network ports and a plurality of memory blocks in a content-addressable memory wherein each memory block of the plurality of memory blocks is bound to one or more of the plurality of network ports, which instructions, when executed cause said network switch to perform steps comprising:
providing a packet processing engine that processes network traffic received at a network port of the plurality of network ports in the network switch;
monitoring a traffic profile of the network traffic received at the network port and another traffic profile of another network traffic received at another network port of the plurality of network ports;
deallocating one or more memory blocks of the plurality of memory blocks from said another network port;
allocating, based on the traffic profile of the network traffic received at the network port, said one or more memory blocks for use by the network port as a logical classification table; and
associating the logical classification table with the network port, for use by the packet processing engine in processing subsequent network traffic received at the network port.

* * * * *

UNITED STATES PATENT AND TRADEMARK OFFICE
CERTIFICATE OF CORRECTION

PATENT NO. : 9,544,232 B2  
APPLICATION NO. : 14/072658  
DATED : January 10, 2017  
INVENTOR(S) : Srinivasan et al.

It is certified that error appears in the above-identified patent and that said Letters Patent is hereby corrected as shown below:

In Column 1, Lines 60-61, delete "clasification" and insert -- classification --, therefor.

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*